W. E. WILLIAMS.
AUTOMOBILE TRUCK WHEEL.
APPLICATION FILED NOV. 17, 1919.
1,435,437.
Patented Nov. 14, 1922.
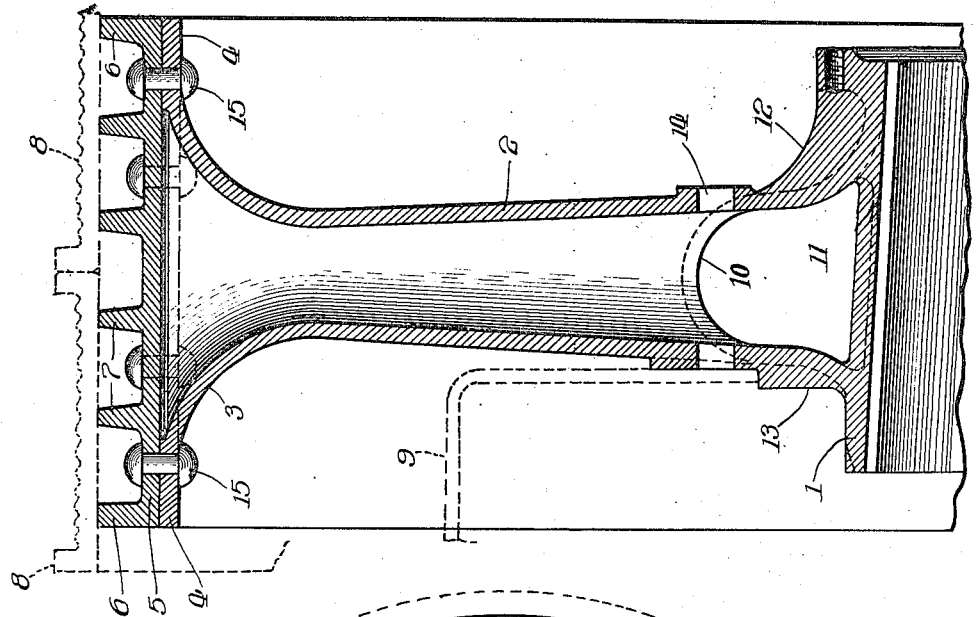
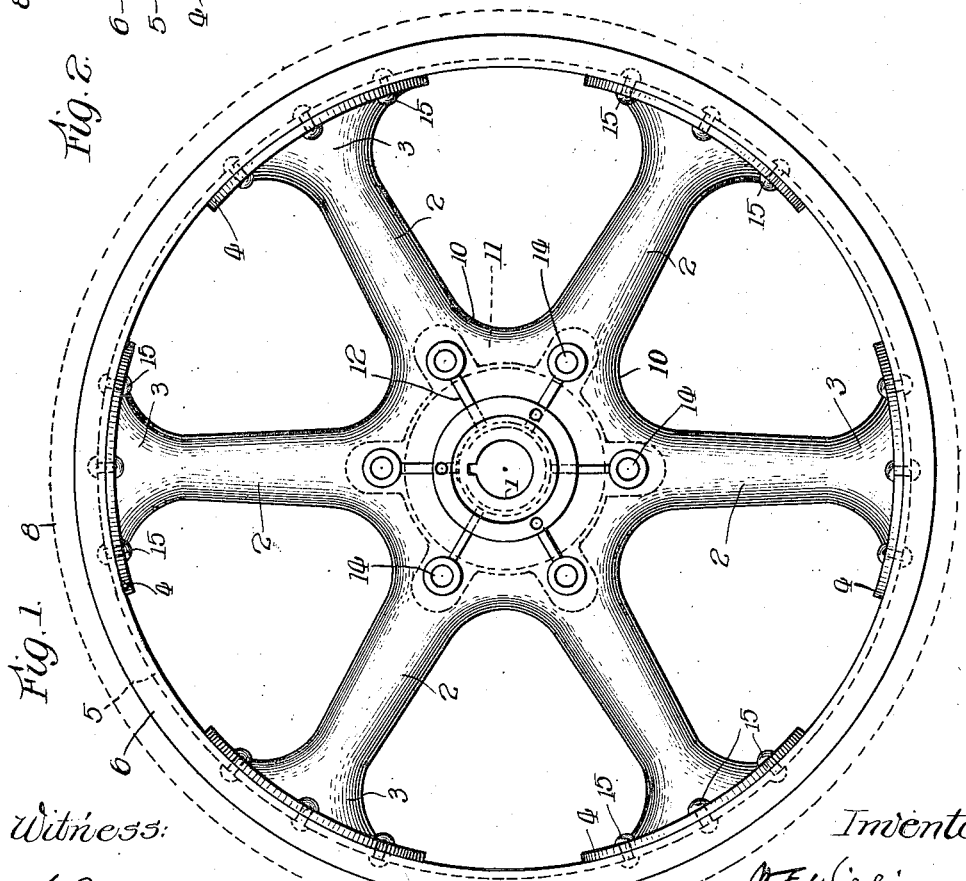

Patented Nov. 14, 1922.

1,435,437

UNITED STATES PATENT OFFICE.

WILLIAM ERASTUS WILLIAMS, OF CHICAGO, ILLINOIS.

AUTOMOBILE TRUCK WHEEL.

Application filed November 17, 1919. Serial No. 338,682.

*To all whom it may concern:*

Be it known that I, WILLIAM ERASTUS WILLIAMS, a citizen of the United States, a resident of Chicago, in the county of Cook and State of Illinois, have invented a new and useful Improvement in Automobile Truck Wheels, of which the following is a specification.

My invention relates to wheels wherein cast spiders for the hub and spokes are provided with a rolled section rim.

The object of the invention is to produce a very strong, light, cheaply constructed and good looking wheel.

Cast automobile truck wheels which practically must be thin, shrink unequally in cooling and while difficult to make involve serious foundry losses. The shrinkage being very unequal, much metal must be used in the rim and be largely turned off to give proper finished form. As the rim in such wheels is very broad, the extra metal provided and then so cut away involves great expense. A spider of cast metal may without harm shrink as it will, for well known reasons, and if to a cast spider a rim of uniform cross section be added, there is a material saving in weight and cost for wheels of a given strength.

Reference will be had to the accompanying drawings, in which Figure 1 is a front elevation of a rear automobile truck wheel.

Figure 2 is a cross sectional elevation on a larger scale, showing one-half of the wheel.

In the drawing 1 indicates the hub of the wheel which is here shown as being an integral part of the spider which forms the spokes of the wheel, but this is not indispensable. 2 indicates the hollow spokes of the spider which terminate in bell mouthed flange ends 3, having the marginal flanges 4. 5 indicates the rolled rim, here shown as a special section, having the circumferential side flanges 6 and the circumferential internal flanges 7. Other types of section for the rim may be used, but I prefer to use this section as shown.

8 indicates, in dottel lines, the steel bases ordinarily employed with the solid rubber tires for trucks. 9 shows, in dotted lines, the ordinary brake drum position.

For strength, appearance and facility in casting, I make both ends of the spokes and the wall connecting them near the hub curved as shown, which leaves an open continuous core connection as indicated by 11 in Figure 2, which facilitates the molding shrinkage of the casting and the placement of the cores.

The small flanges 12 on the front and 13 on the rear run across from the spokes to the hub barrel. The brake drum is secured to the spider through the medium of bolts which pass through holes 14.

The rim 5 is secured to the flanges 4 of the spider by a series of rivets 15 or by any other suitable means, such as bolts, spot welding or by fusion welding around the margins or through the perforation of the parts.

The wheel thus constructed has more or less the general appearance of a cast wheel and as before said it weighs less and costs less for a given strength, which is a great desideratum.

What I claim is:—

1. The combination with a cast wheel spider having its spokes provided with a terminal flange spanning a rim's width from side to side, of an internally smooth cylindrical rim fitting over and fixed to the end faces of the flanged spokes and provided externally with a series of integral annular spaced ribs of equal height to support a tire base while stiffening the rim.

2. The combination with a cast hub and spokes which have a terminal flange spanning a rim's width of an internally smooth, rolled cylindrical rim fixed to the end faces of the flanged spokes and provided externally with a series of integral, spaced annular ribs of equal height forming peripherally portions of a cylindrical surface, and a tire base fitting over said portions.

3. The combination with a broad internally cylindrical rolled wheel rim having externally numerous integral equally projecting spaced, circumferential tire supporting ribs, of a cast spider having at the outer ends of its spokes laterally projecting flanges extending from side to side of the rim and supporting its marginal portions.

4. The combination with a hub and spokes having open bell-shaped ends merging into terminal flanges, of a rolled rim fitting over, extending from side to side of, and fixed to the flanged spoke ends, and provided with a series of equal, peripheral, integral, spaced ribs part of which extend across the open spoke ends to stiffen those portions of the rim which transmit to the spokes the greater part of all strains passing to the hub.

Signed at Chicago, in the county of Cook and State of Illinois, this eleventh day of November, 1919.

WILLIAM ERASTUS WILLIAMS.

Witnesses:
J. B. JEFFERSON,
B. J. BERNHARD.